US010769659B2

(12) United States Patent
Kohli

(10) Patent No.: US 10,769,659 B2
(45) Date of Patent: Sep. 8, 2020

(54) PAYMENT CARD TRANSACTION SYSTEMS AND METHODS WITH DYNAMIC GEO-TARGETED, INCENTIVE-BASED TRANSACTION AND DELIVERY MANAGEMENT

(71) Applicant: MasterCard International Incorporated, Purchase, NY (US)

(72) Inventor: Manoneet Kohli, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 289 days.

(21) Appl. No.: 15/786,388

(22) Filed: Oct. 17, 2017

(65) Prior Publication Data

US 2019/0114666 A1     Apr. 18, 2019

(51) Int. Cl.
| | | |
|---|---|---|
| G06Q 30/00 | (2012.01) | |
| G06Q 30/02 | (2012.01) | |
| G06Q 10/08 | (2012.01) | |
| G06Q 20/34 | (2012.01) | |
| G06Q 20/10 | (2012.01) | |
| G06Q 20/32 | (2012.01) | |
| G06Q 20/38 | (2012.01) | |
| G05B 19/418 | (2006.01) | |

(52) U.S. Cl.
CPC ....... G06Q 30/0253 (2013.01); G06Q 10/083 (2013.01); G06Q 20/102 (2013.01); G06Q 20/3224 (2013.01); G06Q 20/34 (2013.01); G06Q 20/387 (2013.01); G06Q 30/0261 (2013.01)

(58) Field of Classification Search
CPC ............... G06Q 30/0277; G06Q 30/02; G06Q 30/0241; G06Q 30/0253; G06Q 20/387; G06Q 20/3224; G06Q 20/102; G06Q 30/0261; G06Q 20/34; G06Q 10/083
See application file for complete search history.

(56) References Cited

U.S. PATENT DOCUMENTS

| | | | |
|---|---|---|---|
| 7,437,357 B2 | 10/2008 | Monberg et al. | |
| 9,269,103 B1 * | 2/2016 | Kumar | ............... G06Q 30/0605 |
| 9,721,262 B2 | 8/2017 | Krone | |

(Continued)

OTHER PUBLICATIONS

"Pay2you places: The mobile payment with geo-location". (Year: 2014).*

Primary Examiner — Maria V Vanderhorst
(74) Attorney, Agent, or Firm — Armstrong Teasdale LLP

(57) ABSTRACT

Electronic payment card processing systems and methods include at least one host computing device that accepts transaction data as payment card transactions are made and processed over the multi-party payment processing network. Based on the accepted transaction data, the host computing device identifies a first payment card transaction between a first enrolled cardholder and a first enrolled merchant that includes a delivery of a first good to a location that is within a predefined geographic area including the first enrolled merchant. The host computing device retrieves at least one incentive offer relating to a second enrolled merchant and involving a delivery of a second good within the predefined geographic area, and sends the at least one incentive offer to additional enrolled cardholders within the predefined geographic area.

18 Claims, 7 Drawing Sheets

(56) References Cited

U.S. PATENT DOCUMENTS

| | | |
|---|---|---|
| 2001/0049636 A1 | 12/2001 | Hudda et al. |
| 2012/0203619 A1 | 8/2012 | Lutnick et al. |
| 2013/0080239 A1* | 3/2013 | Okerlund ........... G06Q 30/0226 |
| | | 705/14.33 |
| 2013/0191213 A1* | 7/2013 | Beck .................. G06Q 20/3224 |
| | | 705/14.53 |
| 2016/0148306 A1 | 5/2016 | Bellavance et al. |
| 2016/0350809 A1 | 12/2016 | Hammad et al. |
| 2017/0178174 A1* | 6/2017 | Mitchell ............ G06Q 30/0233 |

* cited by examiner

PAYMENT CARD TRANSACTION SYSTEMS AND METHODS WITH DYNAMIC GEO-TARGETED, INCENTIVE-BASED TRANSACTION AND DELIVERY MANAGEMENT

BACKGROUND

This disclosure relates generally to electronic payment systems for payment card transactions, and more specifically to electronic payment card systems and methods with transaction-based and location-based merchant incentive notification capability and dynamic geo-targeted delivery management of goods provided by different merchants to cardholders in the same geographic area.

Electronic payment card processing systems are in widespread use to process transactions between a payment card holder, a merchant, an acquirer bank, and an issuing bank. The transaction may involve the physical payment card itself at a point-of-sale terminal, a device associated with a payment card (or an account of a payment card) that includes payment card information and digital payment capability (e.g., a smart phone device including a digital wallet), or manually entered payment card information via another device such as a computer device interfacing with a merchant online. Sophisticated multi-party payment card processing systems are known to process payment card transactions, confirm authorized charges, manage payments and transfer of funds, confirm payment status, and compute available credit balances.

When a cardholder uses a payment card (e.g., a credit card or a debit card) to initiate a transaction to purchase goods or services from a merchant, an acquiring bank (i.e., the merchant's bank) will typically reimburse the merchant for the transaction. The acquiring bank will then settle those funds with an issuing bank of the account corresponding to the payment card by presenting transaction data, associated with the transaction, to a payment processor. In a process known as clearing, transaction data is communicated from the acquiring bank through the payment processor to the issuing bank. After clearing, settlement of the final payment occurs via the payment processor. Settlement is a process used to exchange funds between the acquiring bank and the issuing bank for the net value of a batch of all monetary transactions that have cleared for that processing day.

Merchants sometimes provide home delivery services for purchased goods to their customers in the same general area, as well as delivery services to another location such as a business provided that it is also within the same general area. Often, such merchants offer home delivery services only within a limited area defined by a radius of miles from the actual merchant location. Also, and sometimes in addition to limited delivery area requirements, merchants sometimes limit delivery services to orders that meet minimum order requirements, typically in terms of dollar value. Orders outside the limited delivery area and/or orders that do not meet the minimum order requirements are generally not considered eligible for delivery, and this imposes undesirable limitations on merchant/customer relationships. Customers that may otherwise desire transactions with such merchants may not make them, or may cancel them, because of they do not meet the delivery requirements, and merchants must turn down some customer orders for failure to meet the delivery requirements.

Much transaction data is captured by such multi-party payment card processing systems that is presently under-utilized to address issues presented by merchant delivery eligibility requirements. Merchants and cardholders alike may benefit from information that can be gleaned from a multi-party payment card processing system that can promote and incentivize cardholder transactions with merchants with coordinated delivery management to reduce costs and improve the customer/merchant relationship. Improvements are accordingly desired.

BRIEF DESCRIPTION

In one aspect, the disclosure provides an electronic payment card processing system including at least one host computing device comprising at least one processor in communication with a memory device and a multi-party payment processing network for processing payment card transactions. The at least one host computing device is configured to: accept transaction data as payment card transactions are made and processed over the multi-party payment processing network; based on the accepted transaction data, identify a first payment card transaction between a first enrolled cardholder and a first enrolled merchant that includes a delivery of a first good to a location that is within a predefined geographic area including the first enrolled merchant; retrieve at least one incentive offer relating to a second enrolled merchant and involving a delivery of a second good within the predefined geographic area; and send the at least one incentive offer to additional enrolled cardholders within the predefined geographic area.

In another aspect, the disclosure provides a method for electronically notifying an enrolled cardholder of a location-based merchant incentive offer when a payment card transaction is made between an enrolled cardholder and an enrolled merchant that includes a delivery of a first good to a location within a predefined geographic area. The method is implemented by at least one host computing device including at least one processor in communication with a memory device and a multi-party payment processing network for processing payment card transactions. The method includes: accepting transaction data, with the at least one host computing device, as payment card transactions are made and processed over the multi-party payment processing network; based on the accepted transaction data, identifying a first payment card transaction between a first enrolled cardholder and a first enrolled merchant that includes a delivery of a first good to a location that is within a predefined geographic area including the first enrolled merchant; retrieving at least one incentive offer relating to a second enrolled merchant and involving a delivery of a second good within the predefined geographic area; and sending the at least one incentive offer to additional enrolled cardholders within the predefined geographic area.

In another aspect, the disclosure provides a non-transitory computer readable medium that includes computer executable instructions for electronically notifying an enrolled cardholder of a location-based merchant incentive offer when a payment card transaction is made between an enrolled cardholder and an enrolled merchant that includes a delivery of a first good to a location within a predefined geographic area. When executed by at least one host computing device having at least one processor in communication with a memory device and a multi-party payment processing system, the computer executable instructions cause the at least one host computing device to: accept transaction data as payment card transactions are made and processed over the multi-party payment processing network; based on the accepted transaction data, identify a first payment card transaction between a first enrolled cardholder and a first enrolled merchant that includes a delivery of a first good to a location that is within a predefined geographic area including the first enrolled merchant; retrieve at least one incentive offer relating to a second enrolled merchant and involving a delivery of a second good within the predefined geographic area; and send the at least one incentive offer to additional enrolled cardholders within the predefined geographic area.

DETAILED DESCRIPTION OF THE DISCLOSURE

Figure 1:
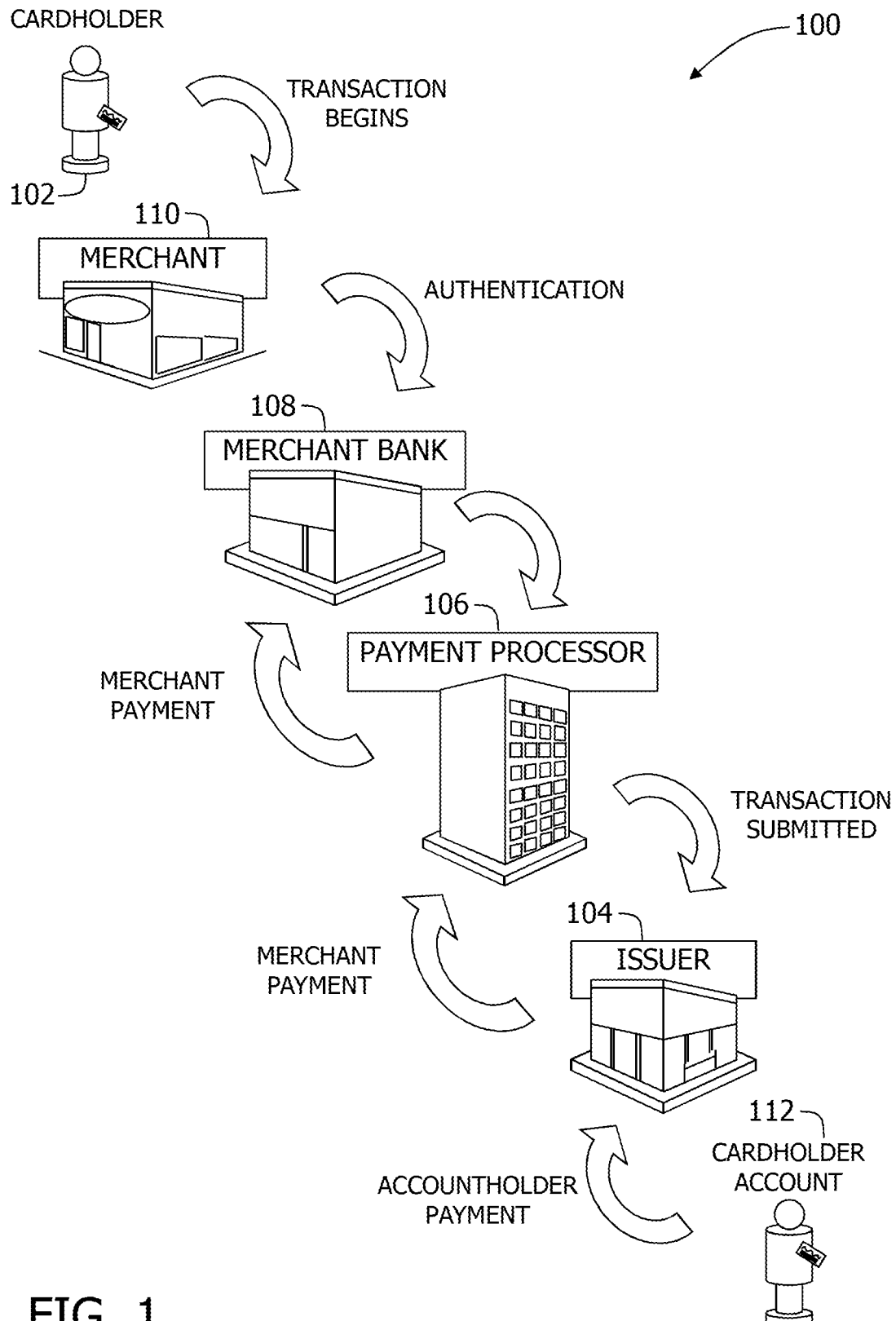
FIG. 1 is a schematic diagram illustrating an exemplary multi-party payment network system for processing payment card transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

The systems and methods of the disclosure employ payment card transaction data aggregation to facilitate merchant incentive notification to cardholders, and aggregation of delivery services for purchases made by the same or different cardholders in a predefined geographic area. The incentive notifications and aggregated delivery services may each be made dynamically in response to completed payment card transactions between cardholders and merchants within the predefined geographic area. Substantial value added services are realized from both the cardholder/customer perspective and the merchant perspective.

The systems and methods of the disclosure may interface with cardholder devices that include a digital wallet service for completing payment card transactions. Enrolled cardholders may receive transaction-based and location-based notifications and incentives generated from the systems and methods of the disclosure relating to enrolled merchants as certain transactions are made that include merchant delivery services to the location of the cardholder's choice, typically a home or business address. The systems and methods of the disclosure include a geo-targeting transaction and delivery manager device that generates incentive offers from other area merchants that may be of interest to cardholders within the delivery area corresponding to a completed order made by payment card, as well as coordinates delivery of goods or items from different merchants. Cardholders in the same geographic area may benefit from real-time updates and offers as deliveries are scheduled, with merchants and cardholders benefiting from aggregated delivery services that may reduce costs to all.

Specifically, by agreeing to the aggregated delivery service management provided by the systems and methods of the disclosure, some merchants may be able to waive delivery eligibility requirements for certain transactions and accept payment card transactions that the merchants may otherwise have to decline. Also by agreeing to the aggregated delivery service management provided by the systems and methods of the disclosure, cardholder customers may enjoy increased convenience and cost savings by completing transactions that otherwise do not meet delivery eligibility requirements.

In contemplated embodiments of the systems and methods of the disclosure, enrolled cardholders having digital wallet services on their cardholder devices may agree to use of location services provided by the cardholder devices by the systems and methods of the disclosure. The systems and methods of the disclosure accept information from enrolled merchants including location details, delivery service eligibility requirements and other information. When an enrolled cardholder places an order that meets the applicable merchant delivery eligibility requirements and completes the transaction via the digital wallet service on the cardholder device, the system and methods of the disclosure can identify the transaction as being made between an enrolled cardholder and an enrolled merchant with delivery service included. Such identification is made in real-time transaction-by-transaction as cardholders complete payment card transactions via the transaction data made available to the electronic payment system.

Once an order for delivery is recognized by the system and methods of the disclosure as being between an enrolled cardholder and an enrolled merchant, the systems and methods of the disclosure may identify other enrolled merchants and additional enrolled cardholders that are known to have conducted transactions in a predefined geographic area including, but not necessarily limited to, the enrolled merchant for the recognized transaction. Notifications including incentive offers may be generated to the enrolled cardholders in the predefined geographic area from different enrolled merchants, and if such incentive offers are redeemed the systems and methods may coordinate and manage an aggregated delivery of orders to the same or different customer cardholders within the predefined geographic area. Such notifications including incentive offers may be time-based and may include dynamically priced, time limited offers. The notifications in some cases may be provided only to enrolled cardholders who have previously conducted transactions with the enrolled merchant for the recognized transaction, and notifications may be provided only for non-competing merchants to the enrolled merchant for the recognized transaction. Additional enrolled merchants may be identified and incentive offers generated while the enrolled merchant for the recognized transaction begins to fulfill the order relating to the recognized transaction.

The enrolled merchant for the recognized transaction and additional merchants agree to pool resources for delivery of the order relating to the recognized transaction and any additional incentive offers that are redeemed. The systems and methods of the disclosure provide notifications to coordinate the delivery of the ordered goods to the cardholders within the predefined area. The costs of delivery may be divided or apportioned amongst the various merchants whose goods are delivered, and the system and methods of the disclosure may provide for payment and settlement of delivery costs amongst the merchants according to predefined terms accepted between the merchants as part of the enrollment process.

The systems and methods of the disclosure therefore share service costs for deliveries made in the predefined geographic area. Merchants can pass along some of the cost savings to their cardholder customers to drive customer loyalty, and perhaps increase sales via the dynamic, actively generated incentive offers by the system. Merchants may mutually benefit from customer traffic relating to other enrolled merchants and realize strategic partnerships with other merchants. From a consumer perspective, burdens of meeting delivery eligibility requirements may be alleviated, and increased convenience is offered with cost savings for certain orders. Enrolled merchants may find that the benefits of the system and its cost savings allow them to relax or possibly eliminate their minimum requirements for delivery eligibility and remove the constraints that they impose to customer relationships that otherwise exist outside of the system. Enrolled merchants may also gain competitive advantage over other area merchants that are not enrolled and will likely experience higher operating costs for delivery services.

In one embodiment, the disclosure provides an electronic payment card processing system including at least one host computing device comprising at least one processor in communication with a memory device and a multi-party payment processing network for processing payment card transactions. The at least one host computing device is configured to: accept transaction data as payment card transactions are made and processed over the multi-party payment processing network; based on the accepted transaction data, identify a first payment card transaction between a first enrolled cardholder and a first enrolled merchant that includes a delivery of a first good to a location that is within a predefined geographic area including the first enrolled merchant; retrieve at least one incentive offer relating to a second enrolled merchant and involving a delivery of a second good within the predefined geographic area; and send the at least one incentive offer to additional enrolled cardholders within the predefined geographic area.

The at least one host computing device may be further configured to: based on the accepted transaction data, identify a second payment card transaction between an enrolled cardholder and the second enrolled merchant that includes the delivery of the second good within the predefined geographic area; and schedule an aggregated delivery of the first good and the second good. The at least one host computing device may also be configured to apportion delivery costs of the first and second good between the first enrolled merchant and the second enrolled merchant.

The at least one host computing device may be further configured to: retrieve at least one incentive offer relating to a second enrolled merchant according to a predetermined merchant type or merchant segment of the respective first enrolled merchant and the second enrolled merchant; verify, based on the accepted transaction data, whether the additional cardholders have previously made a payment card transaction with the first enrolled merchant; and send the at least one incentive offer only to the additional cardholders that have verified previously made transactions with the first enrolled merchant. The at least one host computing device may be further configured to: verify, based on the accepted transaction data, whether the additional cardholders have previously made a payment card transaction with at least one other enrolled merchant in the predefined geographic area besides the first enrolled merchant; and send the at least one incentive offer only to the additional cardholders that have verified previously made transactions with the at least one other enrolled merchant.

The at least one host computing device may be configured to: enroll cardholders; enroll merchants; and accept dynamic transaction-based and location-based incentive offer parameters for enrolled merchants. The at least one host computing device may be further configured to: determine a location of the first enrolled cardholder within the predefined geographic area; and determine the location of additional cardholders relative to the location of the first cardholder. The at least one host computing device may further be configured to send the at least one incentive offer to at least one cardholder device of an enrolled cardholder. The at least one cardholder device may include a digital wallet, and the at least one incentive offer may be a notification message presented to the enrolled cardholder via the digital wallet.

In another embodiment, the disclosure provides a method for electronically notifying an enrolled cardholder of a location-based merchant incentive offer when a payment card transaction is made between an enrolled cardholder and an enrolled merchant that includes a delivery of a first good to a location within a predefined geographic area. The method is implemented by at least one host computing device including at least one processor in communication with a memory device and a multi-party payment processing network for processing payment card transactions. The method includes: accepting transaction data, with the at least one host computing device, as payment card transactions are made and processed over the multi-party payment processing network; based on the accepted transaction data, identifying a first payment card transaction between a first enrolled cardholder and a first enrolled merchant that includes a delivery of a first good to a location that is within a predefined geographic area including the first enrolled merchant; retrieving at least one incentive offer relating to a second enrolled merchant and involving a delivery of a second good within the predefined geographic area; and sending the at least one incentive offer to additional enrolled cardholders within the predefined geographic area.

The method may further include: identifying, based on the accepted transaction data, a second payment card transaction between an enrolled cardholder and the second enrolled merchant that includes the delivery of the second good within the predefined geographic area; and scheduling, with the at least one host computing device, an aggregated delivery of the first good and the second good. The method may also include: apportioning delivery costs of the first and second good, with the at least one host computing device, between the first enrolled merchant and the second enrolled merchant.

The method may further include: retrieving at least one incentive offer relating to a second enrolled merchant according to a predetermined merchant type or merchant segment of the respective first enrolled merchant and the second enrolled merchant; verifying, based on the accepted transaction data, whether the additional cardholders have previously made a payment card transaction with the first enrolled merchant; and sending the at least one incentive offer only to the additional cardholders that have verified previously made transactions with the first enrolled merchant. The method may also include: verifying, based on the accepted transaction data, whether the additional cardholders have previously made a payment card transaction with at least one other enrolled merchant in the predefined geographic area besides the first enrolled merchant; and sending the at least one incentive offer only to the additional cardholders that have been verified as having previously made transactions with the at least one other enrolled merchant.

The method may further include: enrolling cardholders; enrolling merchants; and accepting dynamic transaction-based and location-based incentive offer parameters for enrolled merchants. The method may include: determining a location of the first enrolled cardholder within the predefined geographic area; and determining the location of additional cardholders relative to the location of the first cardholder. The method may also include sending the at least one incentive offer to at least one cardholder device of an enrolled cardholder. The at least one cardholder device includes a digital wallet, and sending the at least one incentive offer to at least one cardholder device of an enrolled cardholder comprises sending a notification message that is presented to the enrolled cardholder via the digital wallet.

In another embodiment, the disclosure provides a non-transitory computer readable medium that includes computer executable instructions for electronically notifying an enrolled cardholder of a location-based merchant incentive offer when a payment card transaction is made between an enrolled cardholder and an enrolled merchant that includes a delivery of a first good to a location within a predefined geographic area. When executed by at least one host computing device having at least one processor in communication with a memory device and a multi-party payment processing system, the computer executable instructions cause the at least one host computing device to: accept transaction data as payment card transactions are made and processed over the multi-party payment processing network; based on the accepted transaction data, identify a first payment card transaction between a first enrolled cardholder and a first enrolled merchant that includes a delivery of a first good to a location that is within a predefined geographic area including the first enrolled merchant; retrieve at least one incentive offer relating to a second enrolled merchant and involving a delivery of a second good within the predefined geographic area; and send the at least one incentive offer to additional enrolled cardholders within the predefined geographic area.

The computer executable instructions may further cause the at least one host computing device to: based on the accepted transaction data, identify a second payment card transaction between an enrolled cardholder and the second enrolled merchant that includes the delivery of the second good within the predefined geographic area; and schedule an aggregated delivery of the first good and the second good. The computer executable instructions may also cause the at least one host computing device to apportion delivery costs of the first and second good between the first enrolled merchant and the second enrolled merchant.

The technical problems addressed by the payment card processing systems and methods of the disclosure include at least one of: (i) improving a processing of payment card transactions in a multi-party payment card network; (ii) inability to localize payment card transaction data for the benefit of a cardholder; (iii) inability to coordinate payment card transactions between different merchants in a selected geographic area; (iv) inability to detect actual location of the cardholder to determine nearby merchants for possible payment card transactions; (v) inability to directly inform a cardholder of available merchant offers for possible payment card transactions within a geofenced area; (vi) inability of merchants to communicate with cardholder customers of other merchants; (vii) inability to efficiently process agreements between merchants with respect to payment card transactions; (viii) inability to coordinate delivery services relating to payment card transactions made in a predefined geographic area; and (ix) inability of merchants share delivery costs of goods purchased with other local merchants as payment card transactions are made.

The payment card processing systems and methods of the disclosure may be implemented using computer programming or engineering techniques including computer software, firmware, hardware, or any combination or subset thereof, wherein the technical effects may be achieved by: (i) electronic identification of payment card transactions according to geographic location; (ii) electronically assisting cardholders in real-time as payment card transactions are made in a predefined geographic area; (iii) electronic coordination of payment card transactions between different merchants in a selected geographic area; (iv) electronic identification and notification to cardholders of nearby merchants for possible payment card transactions; (v) electronically providing information to cardholders of available merchant offers for possible payment card transactions within a geofenced area; (vi) electronically providing cross-merchant communication with cardholder customers of different merchants; (vii) automated compliance with local merchant agreements with respect to payment card transactions made in the predefined geographic area; (viii) automated and aggregated delivery services for different merchants and cardholders in the predefined geographic area; and (ix) automated apportionment of delivery costs between multiple merchants in the predefined geographic area.

The resulting technical benefits achieved by the payment card processing systems and methods include at least one of: (i) electronic leveraging of payment card transaction data to improve cardholder activity and experience in specific geographic locations; (ii) electronically informing cardholders of other merchants offers in the area as payment card transactions are made in real time; (iii) facilitating different merchants within a selected geographic area to electronically coordinate payment card transactions and delivery services in a predefined geographic area as payment card transactions are being made; (iv) electronically informing cardholders of nearby merchants for possible payment card transactions based on at least one payment card transaction within the geographic area; (v) electronically identifying available merchant offers for possible payment card transactions within a geofenced area by a plurality of cardholders within the predefined geographic area; (vi) electronically facilitating cross-merchant communication with cardholder customers of different merchants; (vii) electronically administrating affiliate merchant agreements with respect to payment card transactions of the same cardholders; (viii) automatically coordinating aggregated delivery services across multiple merchants and multiple cardholders in the predefined geographic area; and (ix) electronically automating a real time apportionment of delivery costs for aggregated deliver services for multiple merchants in the same geographic area.

Technical problems that may accrue from added services are also addressed by centrally locating the geo-targeted and aggregated delivery service in a host device. The systems and methods of the disclosure are accordingly able to access payment card transaction data and perform geo-targeted inventive offer generation, communication to cardholders, aggregate delivery service and apportionment of delivery costs without impacting the performance of the payment system network and consuming resources of the payment system network. The payment system network, and specifically the payment processor thereof, may therefore operate at higher speed and with greater transaction efficiency via the distributed nature of the system with the centrally located host device that separately handles the geo-targeted inventive offers and delivery aspects described herein. By processing financial transactions in the manner described in this disclosure, some embodiments improve user experience, user efficiency, and/or user interaction performance by using transaction data associated with a prior financial transaction without adding to the requirements of the payment processor in use.

Additionally or alternatively, some embodiments potentially reduce a quantity of requests to generate geo-targeted incentive offers that need to be processed. In this manner, the embodiments described herein may facilitate achieving a balance between convenience to the cardholder, the needs of the merchant and the resources available in the computing devices included. Additionally, some embodiments may reduce processor load by reducing an amount of data to be analyzed or processed, reduce network bandwidth usage and/or improve communication between systems by reducing an amount of data to be transmitted, improve processor security and/or improve data transmission security. In some embodiments, the subject matter described herein may facilitate increasing processor speed and/or improving operating system resource allocation.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Technology, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

Merchants that provide delivery services for purchased goods to their customers are faced with a number of practical issues. The cost of delivering goods to a home or business location in most cases requires that a purchase of goods exceeds a minimum value as well as the location of delivery to be within a predetermined range of travel. Separately or in combination, such requirements are generally considered delivery eligibility requirements and as such customers who do not meet the requirements but nonetheless desire delivery may not complete transactions with merchants. In the case of merchants such as restaurants or purveyors of food, this can impose certain limitations on their business to serve an existing customer base or expand their customer base. Also in the case of food items, delivery may be desirably constrained even further than other types of goods to meet freshness requirements. As such, efficient delivery of food items introduces additional challenges to merchants.

Delivery eligibility requirements for certain merchants likewise impose undesirable impacts on customer relationships. Customers that may otherwise desire transactions with merchants may not make them, or may have to cancel them, because of they do not meet the delivery requirements. Merchants must likewise turn down some customer orders for failure to meet the delivery requirements. Negative customer experiences may result.

Much transaction data is captured by multi-party payment card processing systems that is presently under-utilized to address issues presented by merchant delivery eligibility requirements. Merchants and cardholders alike may benefit from information that can be gleaned from a multi-party payment card processing system that can promote and incentivize cardholder transactions with merchants with coordinated delivery management to reduce costs and improve the customer/merchant relationships. Aggregated delivery service at reduced cost to all is possible via the exemplary systems and methods described below that employ geo-targeted, transaction-based incentive offers that effectively facilitate coordinated payment card transactions and delivery services amongst different merchants and different cardholders in the same geographic area.

FIG. 1 is a schematic diagram illustrating an exemplary multi-party payment card processing system and network 100 for processing payment card transactions. The present system and method relates to payment card processing network 100, such as a credit card payment network using the Mastercard® payment processor 106. Mastercard® payment processor 106 is a proprietary communications standard promulgated by Mastercard International Incorporated for the exchange of financial transaction data between financial institutions that are registered with Mastercard International Incorporated. (Mastercard is a registered trademark of Mastercard International Incorporated located in Purchase, N.Y.). Embodiments described herein may also relate to digital payment services such as MASTERPASS® by Mastercard or another digital wallet service for a mobile device such as a smartphone.

In payment card processing network 100, a financial institution, such as an issuing bank 104, issues a payment card, such as a credit card account or a debit card account, to a cardholder 102, who uses the payment card to tender payment for a purchase from a merchant 110. To accept payment with the payment card, merchant 110 must normally establish an account with a financial institution that is part of the financial payment system. This financial institution is usually called the "merchant bank" or the "acquiring bank" or simply "acquirer". When a cardholder 102 tenders payment for a purchase with a payment card (also known as a financial transaction card), merchant 110 requests authorization from merchant bank 108 for the amount of the purchase. The request may be performed over the telephone or via a website, but is oftentimes performed through the use of a point-of-sale terminal, which reads the cardholder's account information from the magnetic stripe on the payment card and communicates electronically with the transaction processing computers of merchant bank 108. Alternatively, merchant bank 108 may authorize a third party to perform transaction processing on its behalf. In this case, the point-of-sale terminal will be configured to communicate with the third party. Such a third party is usually called a "merchant processor" or an "acquiring processor."

Using payment processor 106, the computers of merchant bank 108 or the merchant processor will communicate with the computers of issuing bank 104 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by Mastercard International Incorporated, an authorization code, and/or other transaction identifiers that may be used to identify the transaction.

The payment network may be configured to process authorization messages, such as ISO 8583 compliant messages and ISO 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO® 20022 compliant messages are defined by the ISO 20022 standard. For example, ISO 20022 compliant messages may include acceptor to issuer card messages (ATICA).

During the authorization process of the payment card processing system, the clearing process is also taking place. During the clearing process, merchant bank 108 provides issuing bank 104 with information relating to the sale. No money is exchanged during clearing. Clearing (also referred to as "first presentment") involves the exchange of data required to identify the cardholder's account 112 such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated, which identifies that specific transaction. When the issuing bank 104 receives this data, it posts the amount of sale as a draw against the available credit in the cardholder account 112 and prepares to send payment to the merchant bank 108.

When a request for authorization is accepted, the available credit line or available account balance of cardholder's account 112 is decreased. Normally, a charge is not posted immediately to a cardholder's account 112 because bankcard associations, such as Mastercard International Incorporated, have promulgated rules that do not allow a merchant to charge, or "capture," a transaction until goods are shipped or services are delivered. When a merchant 110 ships or delivers the goods or services, merchant 110 captures the transaction by, for example, appropriate data entry procedures on the point-of-sale terminal. If a cardholder 102 cancels a transaction before it is captured, a "void" is generated. If a cardholder 102 returns goods after the transaction has been captured, a "credit" is generated.

After a transaction is captured, the transaction is settled between merchant 110, merchant bank 108, and issuing bank 104. Settlement refers to the transfer of financial data or funds between the merchant's account, merchant bank 108, and issuing bank 104 related to the transaction. Usually, transactions are captured and accumulated into a "batch," which is settled as a group.

Figure 2:
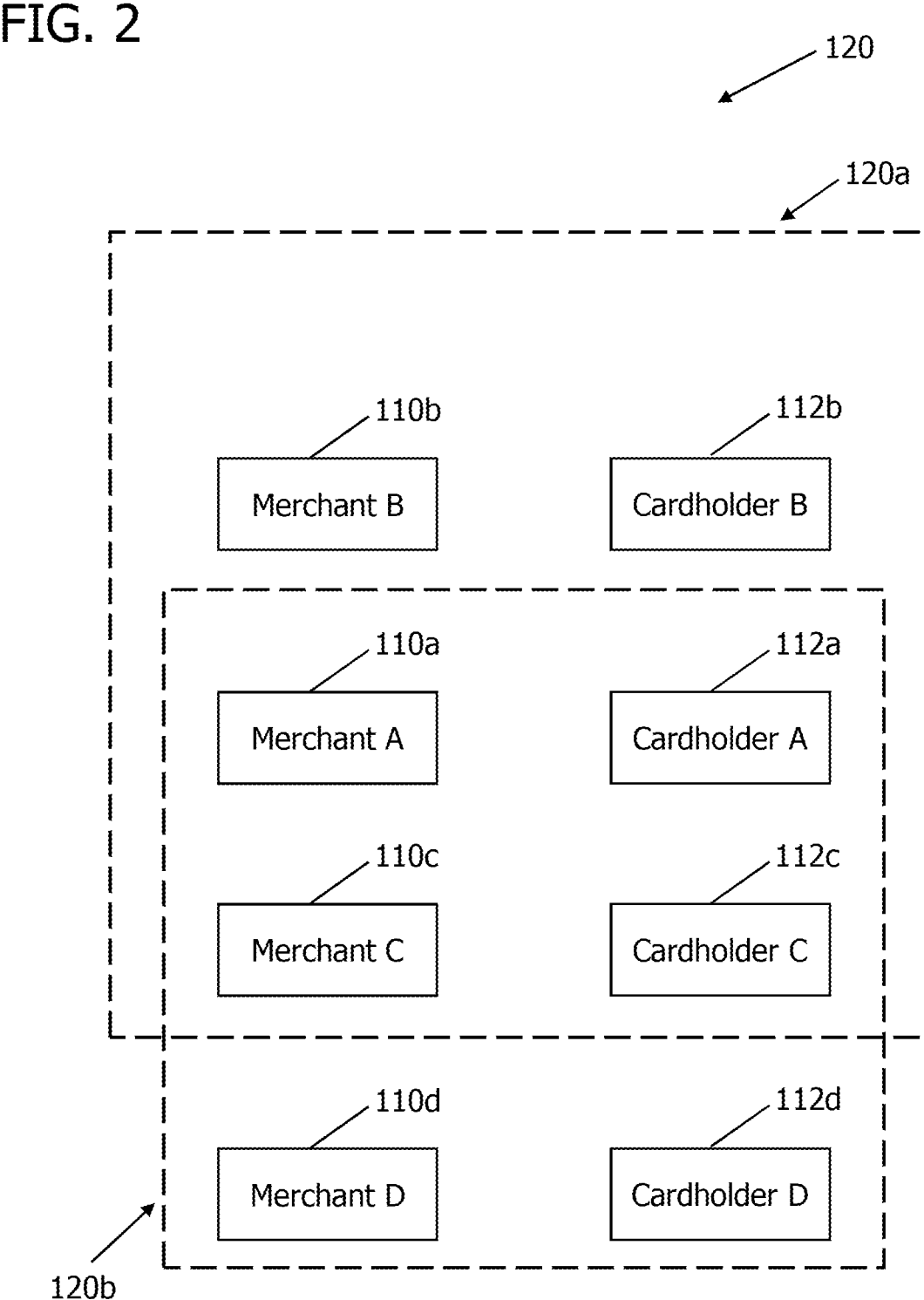
FIG. 2 schematically represents exemplary geofenced areas including participating merchants and cardholders for the system of the disclosure.

FIG. 2 schematically represents a portion of a geofenced arrangement 120 illustrating a geographic aspect of the system of the disclosure that operates in tandem with the multi-party payment card processing network 100 described above. Multiple geofenced areas may be defined for different participating merchants for the system of the disclosure, with payment card transactions for one of the participating merchants in a geofenced area triggering notifications and offers regarding other participating merchants in the same geofenced area as described below.

The geofenced arrangement 120 in the illustrated example includes two geofenced areas 120a, 120b that overlap in part. The geofenced area 120a includes a first group of merchants 110 each being a part of the multi-party payment card processing network 100 (FIG. 1), and in the simplified example of FIG. 2 such merchants include merchant 110a (Merchant A), merchant 110b (Merchant B) and merchant 110c (Merchant C). Likewise, the geofenced area 120b includes a second group of merchants 110 each being a part of the multi-party payment card processing network 100 (FIG. 1), and in the simplified example of FIG. 2 such merchants include merchant 110b (Merchant B), merchant 110c (Merchant C) and merchant 110d (Merchant D). Therefore, in this example, merchant 110b (Merchant B) and merchant 110c (Merchant C) are in both of the geofenced areas 120a, 120b while merchant 110a (Merchant A) and Merchant 110d (Merchant D) are in the respectively different geofenced areas 120a, 120b.

Any number of cardholders, shown in FIG. 2 as cardholder 112a (Cardholder A), cardholder 112b (Cardholder B), cardholder 112c (Cardholder C), and cardholder 112d (Cardholder D) may be in the geofenced areas 120a and/or 120b at the same or different points in time, and each cardholder may make a payment transaction with any of the merchants 110a, 110b, 110c, or 110d in each geofenced area 120a, 120b.

The geofenced areas 120a, 120b may be decided by the merchants involved in contemplated embodiments, and the selected geofenced area for one merchant may the same or different from one another. The geofenced areas serve to define a geographic area surrounding the physical location of each participating merchant that is enrolled on the system. The geographic area in one embodiment corresponds to a geographic delivery area requirement, and in the example of FIG. 2 the geofenced area 120a may be understood to correspond to a delivery area for merchant 110a (Merchant A), and merchants 110b and 110c (Merchants B and C) are seen to be within the same delivery area. The geofenced area 120b may be understood to correspond to a delivery area for merchant 110c (Merchant C), and merchants 110a and 110d (Merchants A and D) are seen to be within the same delivery area. Such geofencing by delivery area provides opportunities to aggregate delivery services and apportion delivery costs amongst merchants 100a, 110b and/or 110c as described below. Each merchant may select a geographic delivery area that meets their particular business needs.

For example, merchant 110a (Merchant A) may be a pizza parlor and may select a geofenced area 120a for purposes of the system that is defined by a 10 mile radius from its actual physical location, and following the example of FIG. 2, enrolled merchants 110b and 110c (Merchants B and C) are each within ten miles from merchant 110a (Merchant A) and are included in the geofenced delivery area 120a. Other merchants will likely also be found in the geofenced area 120a and may enroll in the system of the disclosure as participating merchants relating to merchants 110a (Merchant A), 110b (Merchant B) and merchant 110c (Merchant C) in the same area.

The example geofenced area 120a shown in FIG. 2 includes two enrolled and participating merchants 110b and 110c (Merchants B and C) that have entered into merchant agreements with merchant 110a (Merchant A). As such, when an enrolled cardholder (e.g., cardholder 112a (Cardholder A)) who is physically within the geofenced area 120a completes a payment card transaction with merchant 110a (Merchant A) that is eligible for delivery within the area 120a, the system described below may send a notice and offer to Cardholder A for an item offered by merchant 110b or 110c (Merchant B or C) pursuant to the merchant agreements.

If Cardholder A accepts the offer from merchant 110b or 110c the corresponding items of Merchant B of C can be delivered to Cardholder A together with the item(s) purchased from merchant 110a, even if the items of Merchant B or C do not themselves satisfy the delivery eligibility requirements of Merchant B or C. Since Merchant A is already making a delivery, the delivery from Merchants B and C can be aggregated with the delivery from Merchant A, and each of the Merchants A, B and C may share the delivery costs. Cardholder A may likewise receive delivered items from Merchants B or C without additional cost since the customer is already paying for the delivery of item(s) for Merchant A.

Beneficially, when cardholder 112a (Cardholder A) makes a payment card transaction with Merchant A that qualifies for delivery, the system described below may send a notice and offer to Cardholder B and C that are in the same area 120 for an item offered by merchants 110a, 110b or 110c (Merchant A, B or C) pursuant to the merchant agreements. If Cardholder B or C accepts the offer from merchant 110a, 110b or 110c the corresponding items can be delivered to Cardholders B or C together with the item(s) purchased from merchant 110a by Cardholder A, even if the items purchased by Cardholder B or C do not themselves satisfy the otherwise applicable delivery eligibility requirements. Since a delivery is already being made in the area 120a to Cardholder A, additional items can be aggregated to include delivery of additional items from Merchants A, B or C to additional Cardholders B or C, with shared delivery costs. As such, once Merchant A receives an order for delivery from Cardholder A, Merchant A is provided additional opportunity to accept orders from Cardholder B and C with aggregated delivery services, while Merchants B and C are provided opportunity to make transactions that may not otherwise have been made but for the offers that were triggered by the transaction made between Cardholder A and Merchant A.

Merchant 110d (Merchant D) may be a Chinese restaurant that is, in the example of FIG. 2 more than 10 miles from merchant 110a (Merchant A) and is therefore not in the geofenced area 120a but instead is in another geofenced area 120b that corresponds to another delivery area for Merchant C. Merchants 110a and 110d (Merchants A and D) are within ten miles of merchant 110c (Merchant C) and as such the geofenced area 120b also includes merchants 110a, 110d. Additional merchants will likely also be found in the geofenced area 120b and may enroll in the system of the disclosure as participating merchants relating to merchant 110c (Merchant C). Additional geofenced areas are possible that include merchant 110d (Merchant D), but not merchants 110a and 110c (Merchants A and C).

If merchants 110b, 110c and 110d (Merchants B, C, and D) have entered into merchant agreements, when an enrolled cardholder who is physically within the geofenced area 120b completes a payment card transaction with merchant 110c (Merchant C), the cardholder receives a notice and offer generated by the system for incentive offers made available for merchants 110a and 110d (Merchants A and D) that are within the geofenced area 120b, and so do additional cardholders that are within the geofenced area 120b in a similar manner to that described above.

It should be evident that from the perspective of merchants 110b or 110d (Merchants B or D) further geofenced areas are possible that may include all or some of the merchants shown (A, B, C and D) based on specific and relative locations of the merchants to one another and the geofenced delivery areas selected by merchants 110b or 110d (Merchants B or D). Considerable flexibility is possible in defining relative geofenced areas for the participating merchants involved. As another example, if merchants 110a or 110c (Merchants A or C) selected a geofenced area having a five mail radius from their physical locations, those geofenced areas may or may not include Merchant B or Merchant D. As such, a cardholder moving from one geofenced area to another and making a payment card transaction with each merchant may result in the generation of notices relating to different incentive offers and different merchants. Practically any number of geofenced areas may be defined to include any number of merchants for purposes of the system of the disclosure.

The geofenced areas may be selected by each enrolled merchant or may be jointly decided via mutual agreement between merchants located in each geofenced area. Many ways to make the geofences known to the system are possible, including but not limited to a designated radius from a predetermined geographic point (e.g., the location of a specific merchant or a mid-point between two merchants) or by drawing a boundary on a map to form a geofenced area of any shape to include or exclude certain merchants or to include or exclude certain areas. Exclusion of a merchant may be desired in the case of a direct competitor merchant or for other business reasons, as may exclusion of certain areas in which a particular merchant may prefer not to solicit cardholders or may be prohibited from soliciting cardholders.

Figure 3:
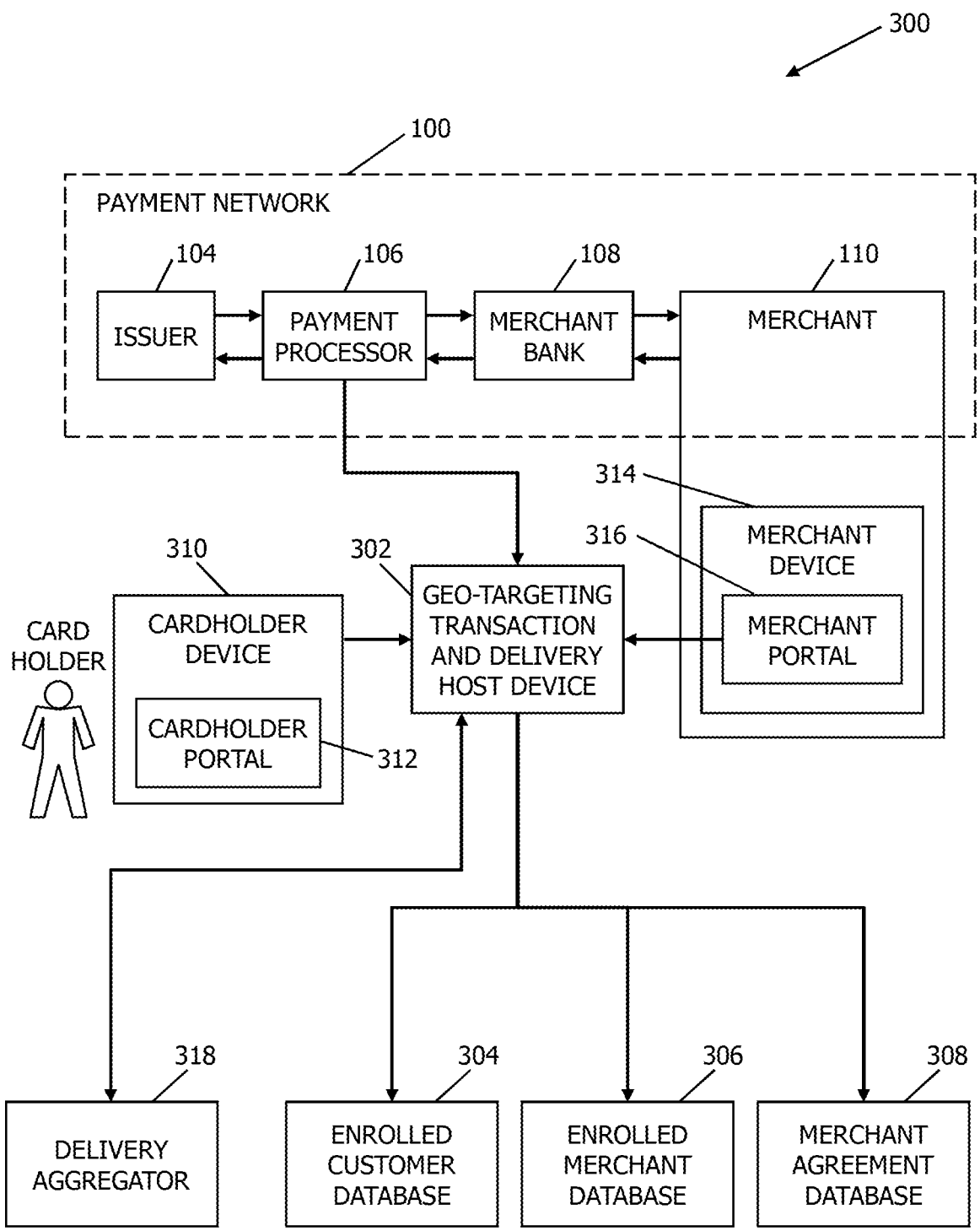
FIG. 3 is a schematic diagram illustrating an exemplary computer system of the disclosure including a geo-targeting transaction and delivery manager device that facilitates geographic merchant incentive notification for participating merchants and cardholders and aggregated delivery services within a predefined geographic area.

FIG. 3 is a schematic diagram illustrating an exemplary system 300 that facilities and coordinates the geofencing and transaction-based, geo-targeting incentive offer and delivery aggregation management features described above in FIG. 2 and related agreements between merchants.

The system 300 includes a geo-targeting transaction and delivery manager device 302 in communication with the payment network 100 (FIG. 1) including the issuer 104, payment processor 106, merchant bank 108 and merchant 110, which represents any of the merchants 110a, 110b, 110c and 110d in FIG. 2. The geo-targeting transaction and delivery manager device 302 is further in communication with an enrolled customer database 304, an enrolled merchant database 306, and an affiliate agreement database 308. A cardholder may further use a cardholder device 310 and cardholder portal 312 accessible via the cardholder device 320 to interact with the geo-targeting transaction and delivery manager device 302, and the merchant 110 may use a merchant device 314 and merchant portal 316 accessible via the merchant device 314 to interact with the geo-targeting transaction and delivery manager device 302. The geo-targeting transaction and delivery manager device 302 may also communicate with a delivery aggregator device 318 such as delivery service dispatch device to schedule and coordinate pick-up and delivery of items to cardholders that relate to the geo-targeted incentive offers to cardholders generated by the system 300.

A cardholder using the cardholder computing device 310 may enroll as a participating cardholder in the geo-targeting transaction and delivery manager device 302. Enrollment may include acceptance of geofence service terms, preferred contact information (e.g., email, SMS text notification, push notification, notification via a digital wallet service, etc.) and preferences for geofence service notifications and the like, or other desired information relating to the cardholder to provide the geo-targeting incentive offer services. In contemplated embodiments, the enrollment includes opt-in informed consent of users to data usage by the system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive enrollment data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

The cardholder enrollment may also include merchant segments and types in which the customer has an interest (or lack of interest) so as to avoid nuisance operation of the system with respect to that individual cardholder. For example, a male cardholder may choose to not receive notifications or incentive offers from a pizza parlor merchant but not a from a sandwich shop merchant. As another example, a cardholder may choose to accept offers from an electronics store merchant but not from a craft store merchant. Various different cardholder preferences and corresponding selections are possible for acceptance by the geo-targeting transaction and delivery manager device 302 in order to create a cardholder profile for reference in providing the geo-targeted incentive offer services to meet the particular preferences of enrolled cardholders.

The services provided by the geo-targeting transaction and delivery manager device 302 is contemplated as an opt-in service such that only specifically enrolled cardholders may experience such services. Permission to utilize location services in the cardholder device 310 may be obtained as part of the enrollment process. Such opt-in consent may be made in any manner desired and accepted by the geo-targeting transaction and delivery manager device 302. In some embodiments, the opt-in consent may be made through a digital wallet service or application residing on the cardholder device 310, and a digital wallet service may provide the cardholder portal 312 shown in FIG. 3. More than one cardholder portal 312 is possible, however, using different devices of the cardholder. The cardholder portal 312 may be the same portal provided for other purposes to allow the cardholder to check payment card transaction activity, review account balances, review payment history, dispute charges, etc. or alternatively may be a unique portal specific to the geo-targeting transaction and delivery manager device 302.

Once a cardholder is enrolled, cardholder information is stored in the enrolled customer database 304. As payment card transactions are made and processed by the payment network 100, the geo-targeting transaction and delivery manager device 302 can retrieve information from the enrolled customer database 304 in order to identify a payment card transaction made by an enrolled cardholder and also determine whether or not the payment card transaction relates to an enrolled merchant to provide the geo-targeted incentive offer services. For example, the geo-targeting transaction and delivery manager device 302 may compare a primary account number (PAN) of a payment card transaction from, for example, the payment processor 106 in the payment network 100 as a payment card transaction is completed to see if it corresponds to the PAN of an enrolled cardholder in order to make such a determination. Preferences and cardholder profile information may also be retrieved for purposes of notice generation (or lack thereof) by the geo-targeting transaction and delivery manager device 302.

A merchant 110 using the merchant computing device 314 may enroll as a participating merchant in the geo-targeting transaction and delivery manager device 302. Merchant enrollment may include acceptance of geofence service terms, and acceptance of merchant profile information for use by the geo-targeting transaction and delivery manager device 302. The merchant profile may include the merchant name and location(s) of their stores, applicable market segment identifiers and descriptors (e.g., grocery, sporting goods, restaurant, electronics), applicable geofence information that correspond to delivery area as described above, affiliate merchant information (by name and location), and merchant agreement information. The geo-targeting transaction and delivery manager device 302 will generate notices to enrolled cardholders relating only to identified affiliate merchants of an enrolled merchant, and will only operate in accordance with the terms of an agreement agreed to by each merchant.

Enrolled merchant incentive preferences may also be accepted for use by the geo-targeting transaction and delivery manager device 302 in providing the geo-targeted offer notifications. For example, instead of offering the same incentive at all times, an enrolled merchant may choose to activate the geo-services only on certain days or during certain times within a business day, or to change or alter the notices or incentives based on the time of day that they are generated. For example, in the case of pizza parlor that may be open until midnight, a delivery order made at 11:00 pm should not trigger incentive offers from other merchants that are not open at the time.

As further examples, a franchise owner of multiple stores may offer incentives at some stores but not at others to drive customer traffic to specific ones of their stores. A franchise owner may also offer incentives at different stores relating to transactions with another participating merchant that is made on different days. Considerable flexibility and sophistication is possible to accommodate the needs and interests of all types of merchants. The offers may be limited in time or otherwise restricted in any manner desired.

Once a merchant is enrolled, merchant information is stored in the enrolled merchant database 306 for use by the geo-targeting transaction and delivery manager device 302 to provide geo-targeted incentive offers to enrolled cardholders.

In operation, the geo-targeting transaction and delivery manager device 302 receives transaction data and information from the card processor 106 as payment card transactions are made. Referencing the enrolled customer database 304, the geo-targeting transaction and delivery manager device 302 can identify, based on the transaction data made available to it, whether a given transaction relates (or not) to an enrolled cardholder and an enrolled merchant. If the transaction does not relate to an enrolled cardholder and an enrolled merchant the geo-targeting transaction and delivery manager device 302 takes no further action and proceeds to analyze the next transaction.

If a given transaction does relate to an enrolled cardholder and an enrolled merchant the geo-targeting transaction and delivery manager device 302 determines the cardholder location and compares it to the merchant location to make sure that the cardholder is actually physically present in the area and may benefit from the geo-targeting offer services provided. For example, if a given transaction processed by the payment processor 106 relates to a card-not-present transaction wherein the cardholder and the merchant are in different geographic areas (e.g., if the cardholder location and the merchant location are hundreds of miles apart) the geo-targeting offer services are neither needed nor desired for that particular cardholder and are therefore not provided.

On the other hand, any enrolled cardholder whose location is confirmed to be within the applicable geofenced area for the transaction, may benefit from the geofence services. The geo-targeting transaction and delivery manager device 302 proceeds to generate a notice including an offer from one or more additional merchants in the geofenced area according to the enrolled merchant's profile in the database 306 and/or applicable terms of merchant agreements in the database 308. The generated offer is stored and the geo-targeting transaction and delivery manager device 302 awaits to see if another transaction can be identified between an enrolled cardholder and merchant relating to a generated offer.

If the geo-targeting transaction and delivery manager device 302 detects a transaction between one of the enrolled cardholders and one of the enrolled merchants corresponding to a generated offer previously made, the geo-targeting transaction and delivery manager device 302 informs the delivery aggregator device 318 of an additional item to be delivered. The delivery aggregator device 318 can, in turn, provide pick-up and drop-off information for aggregated delivery services. Either the geo-targeting transaction and delivery manager device 302 or the delivery aggregator device 318 can, in turn, compute apportioned delivery fees and submit them to the payment network 100 for automatic processing and payment to the affected merchants.

Merchant agreement information is stored in the database 308. The merchant agreement information may be accepted through the merchant portal 316 or in another manner as desired. The merchant agreement information includes dynamic parameters needed by the geo-targeting transaction and delivery manager device 302 to retrieve and generate applicable geo-targeted offers to enrolled cardholders by the geo-targeting transaction and delivery manager device 302.

In one aspect, the dynamic merchant fee parameters may include limited time offers that fall within a timeframe of expected delivery for an initial transaction. For example, Cardholder A completes an order for pizza from Merchant A to be delivered that is paid with a payment card. The pizza delivery is scheduled for delivery within 45 minutes from the time of order. Any geo-targeted offers from other merchants in the geofenced area of Merchant A must therefore be capable of delivery in the same 45 minute timeframe for aggregated delivery to be completed with the pizza. Relative distances of the other merchants from Merchant A and Cardholder A may be taken into account for determining whether a geo-targeted offer should be made and/or whether it should made with a limited time for acceptance. For example, an offer for a sports jersey may be made from another merchant that is valid only for 15 minutes to ensure that the jersey can be delivered with the pizza without affecting the timeliness of the pizza delivery. By implication, the sports jersey offer should only be made when jerseys are actually in stock and can be quickly scheduled for delivery by the delivery aggregator device 318. As a result, jersey offers may sometimes result when a pizza order is made and sometimes not result depending on the jersey stock at any given time.

In another aspect, intelligent incentive offer generation may be made depending on delivery resources at the time that initial payment card transactions are made. Following the example above, a sports jersey may be in stock, but because of delivery demands at the time the jersey offer may not be made because of logistical issues in meeting delivery schedules in progress. For example, congested traffic conditions or adverse weather conditions may cause the system to make geo-targeted offers less frequently or may suspend them temporarily. Particularly when delivery of food is involved, its delivery must sometimes be prioritized to maintain positive customer relations.

In another aspect, the dynamic merchant fee parameters include a consideration of market segments of respective enrolled merchants within a geofenced area. In general, the merchant enrollment is completed in a manner that allows any enrolled merchant to exclude its direct competitors, or the system is otherwise configured to avoid making a geo-targeted incentive offer from a competing merchant. For example, a pizza parlor merchant may choose to exclude other pizza offers by different pizza parlor merchants that may otherwise be triggered by the system. As another example, a book store merchant may choose to exclude other book store offers by different book store merchants that may otherwise be triggered by the system.

Also, the system is preferably configured to intelligently match offers generated with some reasonable correlation to the initial transaction such that it may be welcomed and appreciated by the cardholder who receives it. Such intelligent offer generation and correlation may be made in reference to cardholder profile information, transaction history for individual cardholders and individual merchants, particular cardholder locations, and patterns or trends exhibiting applicable cardholder behavior and preferences. As an example, an order for a pizza from Merchant A may appropriately generate an offer for a DVD purchase from an electronics merchant as the cardholder may indeed enjoy the pizza with a movie. As another example, an order for a pizza from Merchant A may appropriately generate an offer for a sporting jersey for a local sports team from a sporting goods store as the customer may plan to watch the local team play while enjoying the pizza.

Conversely, the system is configured to avoid making an affiliate merchant offer that may simply seem out of place, inappropriate, or confusing to a cardholder. For example, a cardholder that orders a pizza with a payment card for delivery may question a geo-targeted offer from a local jewelry store, whereas a cardholder that requests delivery from a high end clothier may not question the same offer. As another example, a purchase from a jewelry store may trigger an offer for delivery of flowers that may be appreciated by a cardholder, while the same offer for delivery of flowers may be questionable if linked to a purchase of office supplies. Therefore, in the case where Cardholder A makes the initial transaction with Merchant A, additional offers to from other merchants to Cardholder A can be sent (or not) by the system depending on the nature of the goods involved in the initial transactions and the geo-targeted offers available from the other merchants.

In generating geo-targeted offers still further considerations may provide additional sophistication in the geo-targeting transaction and delivery manager device 302. For example, when an enrolled cardholder completes a transaction with Merchant A the system can identify other enrolled cardholders within the corresponding geofenced area that have in the past completed payment card transactions with Merchant A, and send geo-targeted incentive offers for other merchants only to the enrolled cardholders in the geofenced area that have previously made transactions with Merchant A. Also, the system may identify or verify whether other identified enrolled cardholders within the corresponding geofenced area have previously made other payment card transactions with other merchants, besides Merchant A, in the geofenced area before sending any geo-targeted incentive offers. As such, enrolled customers that have not previously conducted transactions with Merchant A or other merchants in the geofenced area may not receive any geo-targeted offers that are responsive to a completed payment card transaction with Merchant A. Enrolled cardholders may therefore be provided geo-targeted offers only from other merchants that they have transacted with before, and only in areas in which they have conducted business before, to reduce any perceived nuisance operation of the system.

In embodiments wherein transaction data regarding specific goods and services are shared pursuant to agreements between merchants, the merchants may refine their use of the geo-targeting transaction and delivery manager device 302 and optimize its returns. For example, participating merchants may refine their merchant profiles, adjust their geofence preferences, or re-negotiate their merchant agreements in view of a greater understanding of the effectiveness and/or the monetary value provided by the geo-incentive services provided. In particular, merchants may lower or relax their order delivery eligibility requirements, which may be made known to the system, and hence adopt different order delivery eligibility requirements than they may have adopted before they enrolled in the system.

Consumer protection laws and privacy regulations are to be respected by the network 100 and the geo-targeting transaction and delivery manager device 302. Certain types of consumer data may accordingly not be shared without consent of system users, which as mentioned above may be obtained as part of the system enrollment. The network 100 can provide as much information as cardholders may permit, or that merchants are willing to share, with appropriate sensitivity to providing no more information than is necessary for the benefits of the system to be realized. For example, transaction data may be shared regarding the number of cardholders that have conducted transactions with each merchant in relation to incentive offers generated, without revealing the identity of those cardholders to each merchant or otherwise sharing information that would allow them to be identified.

Alerts, messages and notifications can be automatically generated to each enrolled cardholder as payment card transactions are made with an enrolled merchant. Cardholders that are not enrolled may conduct transactions as before without receiving the geo-targeted offer and aggregated delivery services and without any transaction data being shared, and enrolled cardholders may conduct transactions from non-enrolled merchants without receiving the geo-targeted offer and aggregated delivery services and without any transaction data being shared. Subject to the terms of cardholder and merchant profiles, and applicable merchant agreements, enrolled cardholders conducting transactions with enrolled merchants may or may not receive geo-targeted merchant offers, and may or may not result in any sharing of transaction data.

As demonstrated in the examples above, different cardholders making a payment card transaction with the same enrolled merchant may receive the same or different offers from the same or different additional merchants depending on the applicable profiles and preferences and the times that transactions are made to trigger the geo-targeted services. Likewise, a first enrolled cardholder may receive multiple merchant offers in response to an initial transaction completed with an enrolled merchant, while a second enrolled cardholder may not receive a geo-targeted incentive offer at all depending on the respective preferences of the first and second cardholders as well as enrolled merchant profiles and preferences. The system is capable of unique, customized response to each enrolled cardholder on a transaction-by-transaction basis with each enrolled merchant in a geofenced area.

Figure 4:
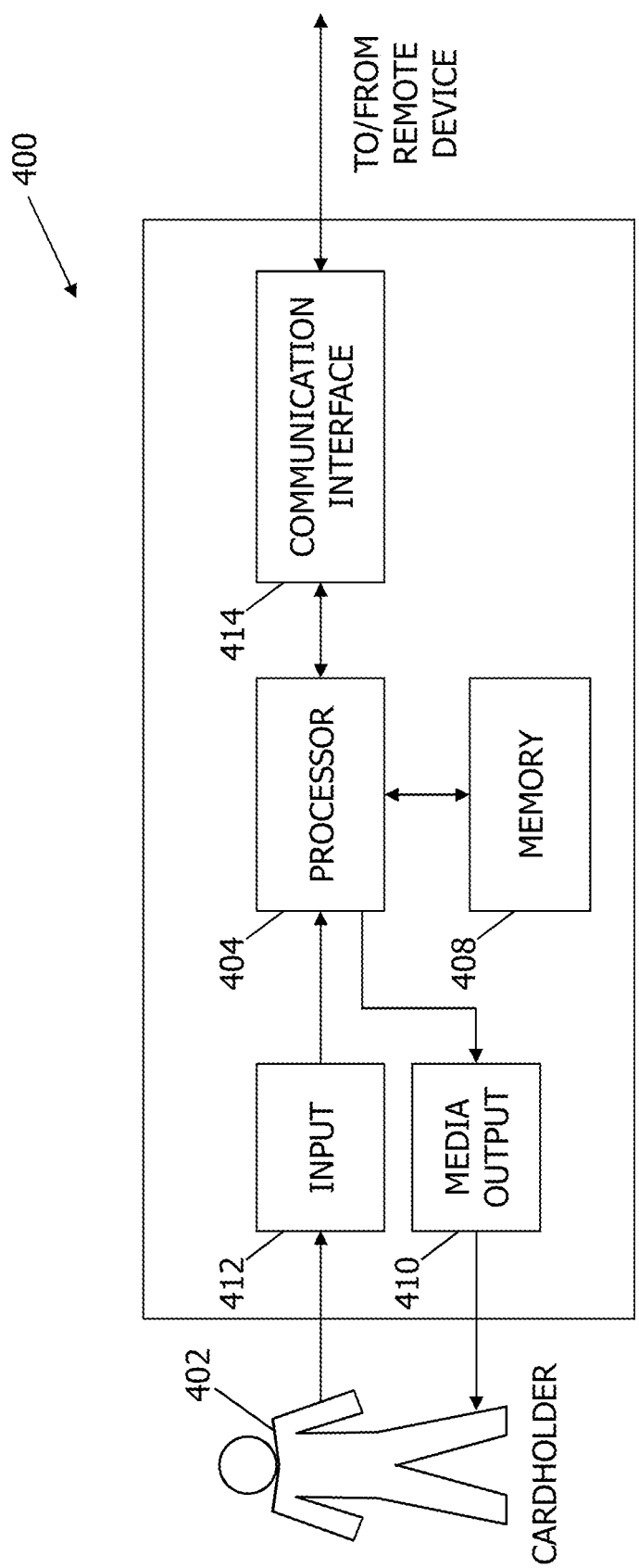
FIG. 4 illustrates an example configuration of a user device for the system shown in FIGS. 1-3.

FIG. 4 illustrates an example configuration of a device 400 operated by a user 402, such as any of the parties described above. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of merchants, and representatives of the geofence host device to effect the system as shown in FIG. 3. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
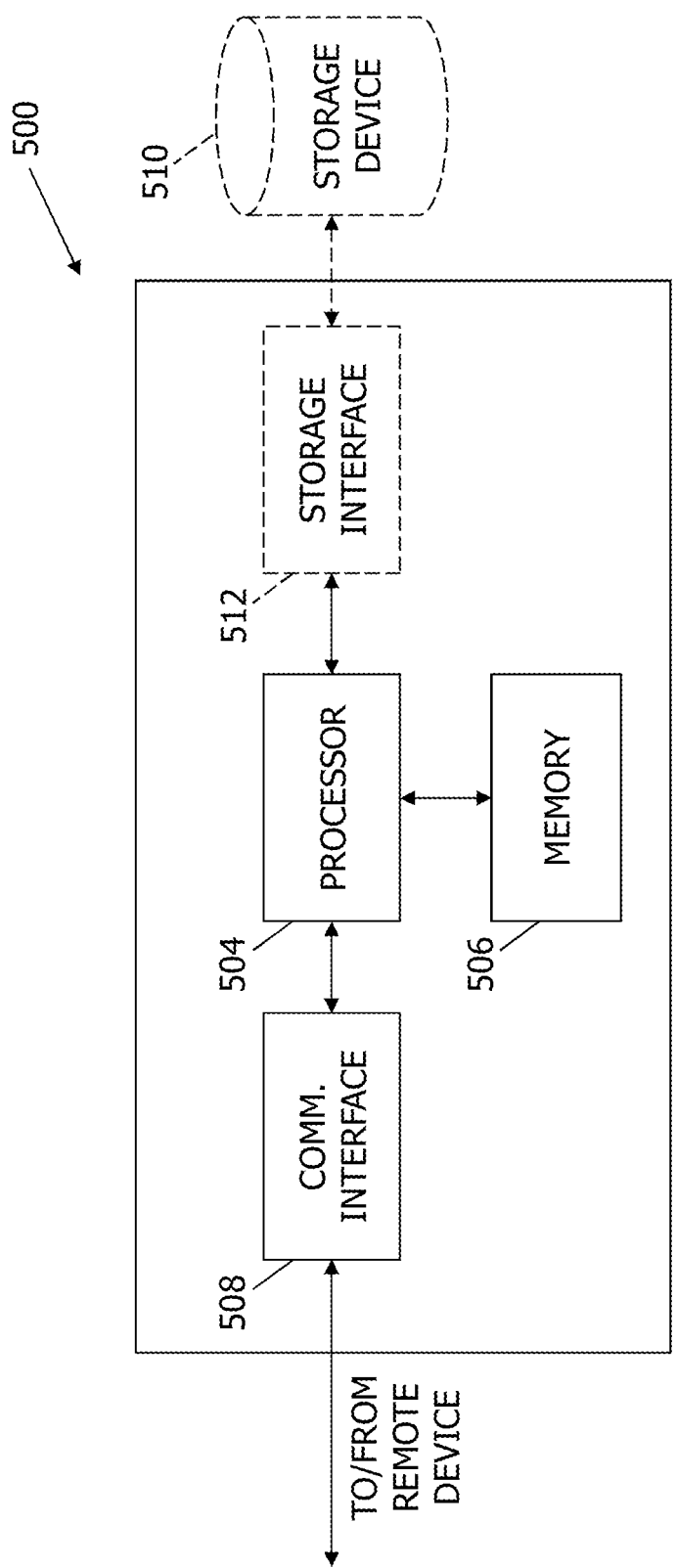
FIG. 5 is a schematic diagram of an example server computing device that may be used with the computer system shown in FIG. 3.

FIG. 5 illustrates an example configuration of a geo-targeting transaction and delivery manager device 500 that confers the geo-incentive services described above. The computing device 500 is sometimes referred to herein as a server-based network "host" device that coordinates and manages the geofencing, generates geo-targeted merchant incentive offers, coordinates aggregated delivery and scheduling tasks, and apportions delivery costs amongst the affected merchants when aggregated delivery is made, although it is not strictly necessary in all embodiments that the host computing device is a server system.

As shown in FIG. 5, the geo-targeting transaction and delivery manager device 500 includes a processor 504 for executing instructions. Instructions may be stored in a memory area 506, for example. Processor 504 may include one or more processing units (e.g., in a multi-core configuration).

Processor 504 is operatively coupled to a communication interface 508 such that geo-targeting transaction and delivery manager device 500 is capable of communicating with a remote device such as a merchant portal, an issuing portal, a delivery carrier portal, or a payment processor. For example, communication interface 508 may receive or transmit transaction data, enrolled cardholder data, enrolled merchant data, merchant agreement data, etc. to the cardholder portal, merchant portal, a payment processor, and/or another client device via a network.

Processor 504 may also be operatively coupled to a storage device 510. Storage device 510 is any computer-operated hardware suitable for storing and/or retrieving data. In some embodiments, storage device 510 is integrated in geo-targeting transaction and delivery manager device 500. For example, geo-targeting transaction and delivery manager device 500 may include one or more hard disk drives as storage device 510. In other embodiments, storage device 510 is external to geo-targeting transaction and delivery manager device 500 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders, enrolled merchants, merchant fee agreements, and geofenced areas. In one embodiment, the database is centralized and stored on the server system 500. In an alternative embodiment, the database is stored remotely from the server system 500 and may be non-centralized. The database may store transaction data including data relating to merchants, merchant locations, cardholders, cardholder location, and affiliate fee agreements and accounting.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
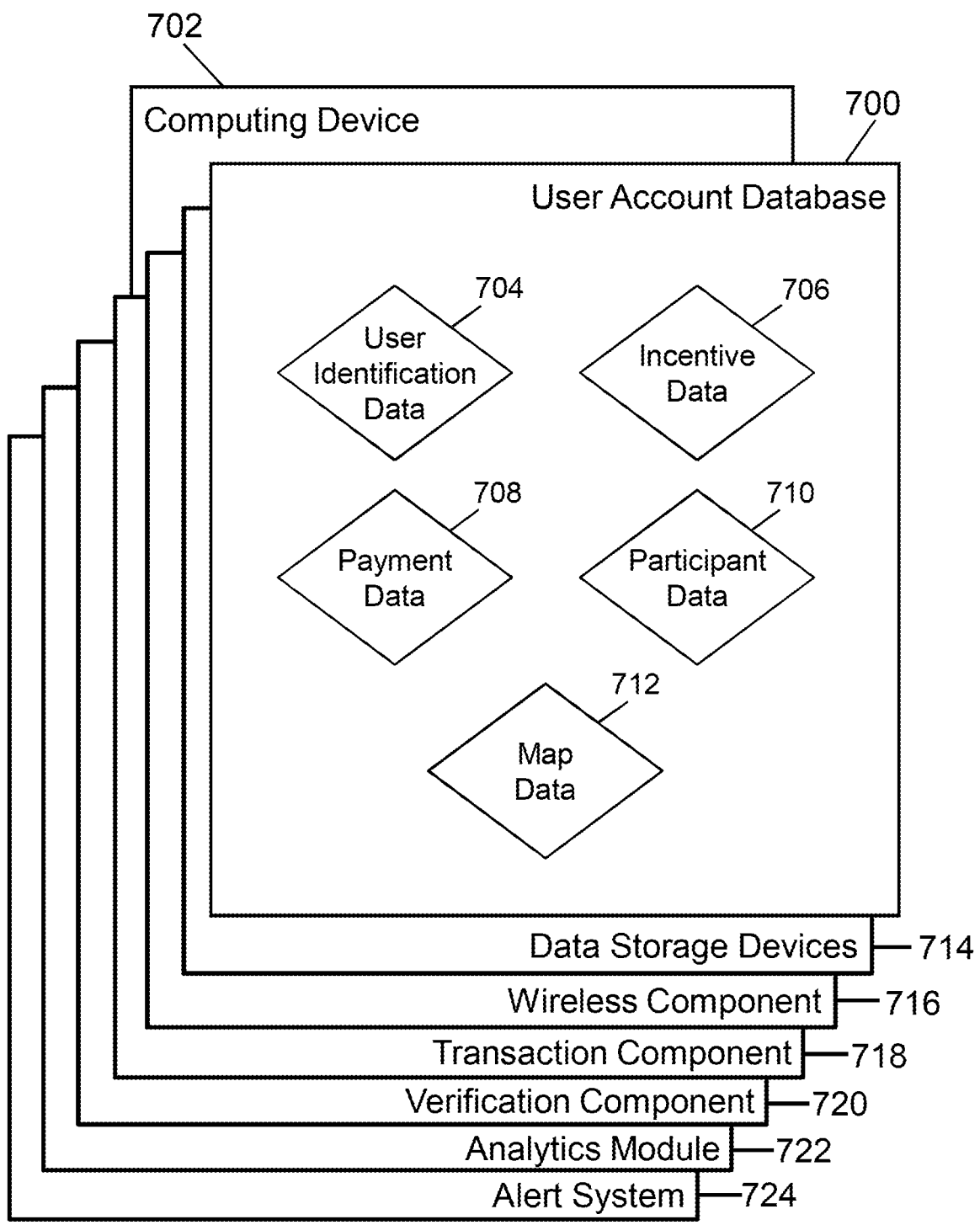
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, geo-targeting incentive data 706, payment data 708, registration data 710, and participant data 712. In contemplated embodiments, user identification data 704 includes, but is not limited to, a user name, a user address, and a user phone number. Geo-targeting incentive data 706 includes geofence information, enrolled cardholder data, merchant data, and merchant agreement data needed to generate incentive offers and process apportioned delivery fees. Payment data 708 includes, but is not limited to, card information, payment history, and a billing address. Merchant data 710 includes information associated with participating merchants, including merchant identifiers, address information, contact information, etc. Participant data 712 includes data associated with third party information (e.g., system administrators).

Computing device 702 includes the database 700, as well as data storage devices 714. Computing device 702 also includes a wireless component 716 and a transaction component 718 for correlating, for example, payment card transactions. An analytics module 722 is included for analyzing transactions, enrollment status, incentive offers generated, incentive offers redeemed, affiliate fee payment determination, and other items of interest. Further included is a verification module 720 that may communicate with a device in the payment network or another device, and an alert module 724 for transmitting an alert to a cardholder, merchant or any other party.

Figure 7:
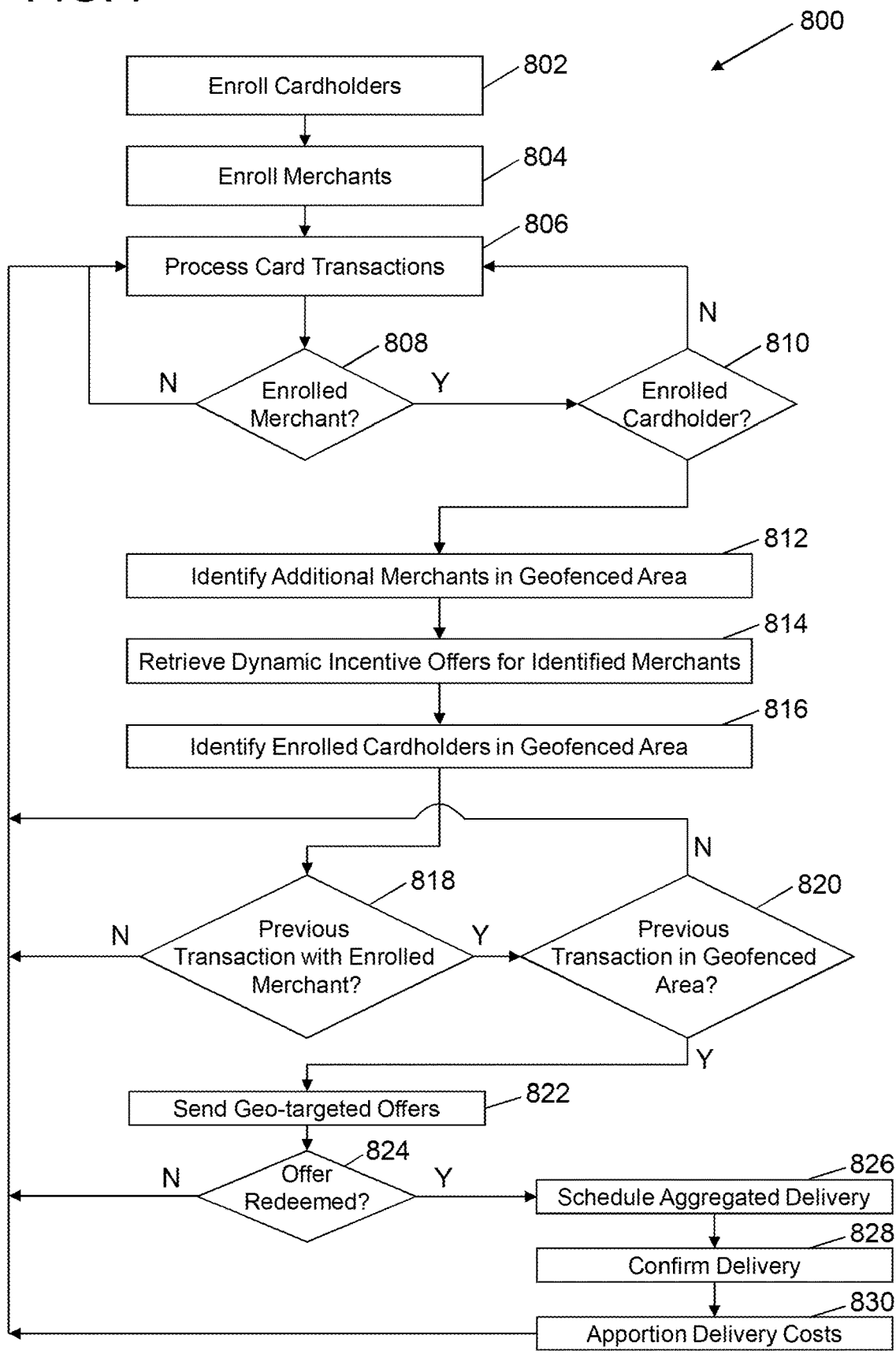
FIG. 7 shows an exemplary process of geo-targeted merchant incentive notification for participating merchants and cardholders and aggregated delivery service management within a predefined geographic area for the system shown in FIG. 3.

FIG. 7 shows an exemplary process 800 of geo-targeted incentive generation, notification and processing for the system 300 shown in FIG. 3.

At step 802, cardholders are enrolled. As contemplated, the enrollment includes opt-in informed consent consistent with application consumer protection and privacy laws and regulations. Cardholder profiles and preferences are accepted by the system as part of the enrollment. Also, as part of the enrollment step, cardholders may consent to use of location of services on a cardholder device in relation to the system 300. An app may be made available for cardholders to download on their cardholder devices (e.g., smartphones) for convenient entry, review, and updates to their personal profile and settings or preferences for the geo-targeted incentive offer services provided. Otherwise, cardholders may access the system via a portal for initial enrollment, to check status, or change or update profiles, preferences or settings for the geo-services.

At step 804, merchants are enrolled. Merchant enrollment may include acceptance of geofence information for a merchant location or locations, merchant profiles and preferences such as those described above. Merchant agreement information described above may be input as part of step 804 or otherwise accepted for use by the system 300. An app may be made available for merchants to download on their merchant devices (e.g., smartphones) for convenient entry, review, and updates to their merchant profile and settings or preferences for the geo-services provided. Otherwise, merchants may access the system via a portal for initial enrollment, check status, or change or update their profiles, preferences or settings for the geo-services.

At step 806, payment card transactions are processed in a conventional manner. At step 808, the transaction data is accepted and analyzed by the system to determine if a processed transaction was made by an enrolled merchant. For example, the system may compare a merchant identifier in a processed transaction to see if matches an identifier of an enrolled merchant. If the analyzed transaction does not involve an enrolled merchant, the system reverts to step 806 and processes payment card transactions.

If the analyzed transaction includes an enrolled merchant, at step 810, the transaction data is analyzed to determine if a processed transaction was made by an enrolled cardholder in the geofenced area for the enrolled merchant. For example, the system may compare a primary account number (PAN) of a processed transaction to see if matches a PAN of an enrolled cardholder. Likewise, a home address, a work address or other cardholder data known to the system may be utilized to determine whether the cardholder is in the geofenced area once the cardholder is identified from the transaction data. If the analyzed transaction does not involve an enrolled merchant or if the cardholder is not within the geofenced area, the system reverts to step 806 and processes payment card transactions.

Steps 808 and 810 presume that the transaction was also identified as a merchant delivery transaction. This may be recognized via a data field in the transaction data that signifies an order for delivery to a location in the corresponding geofenced delivery area for the merchant. If a transaction is not identified as a delivery transaction, the system reverts to step 806 and processes payment card transactions.

At step 812, the system identifies additional enrolled merchants that are in the geofenced area corresponding to the analyzed transaction of steps 808 and 810. The system may use merchant profile information to identify the additional merchants in the geofenced area. The system may build a list of enrolled merchants or refer to a predefined list in different embodiments.

At step 814, the system retrieves dynamic incentive offers from the database 308 that comply with applicable merchant agreements for each of the identified enrolled merchants from step 812.

At step 816 additional enrolled cardholders are identified that are within the geofenced area. Location services of a cardholder device may be used to make the determination at step 816, or cardholder profile information may be used for the purposes of step 816. If the enrolled cardholder for the analyzed transaction at steps 808 and 810 is determined to be outside the geofenced area, the system presumes that the analyzed transaction is a card-not-present transaction made remotely by the enrolled cardholder and as such the enrolled cardholder is excluded from further geo-targeted offer generation. The additional cardholders identified can likewise be confirmed as inside or outside of the geofenced area for the transaction and accordingly can be included or excluded from further geo-targeted offer generation.

In some instances, a relative distance of each additional cardholder can be determined from the location of the enrolled cardholder of the analyzed transaction for the purposes of step 816. Additional cardholders that are closer to the enrolled cardholder of the analyzed transaction will simplify aggregated delivery of goods for further geo-targeted offer generation. Considering a densely developed urban environment, multiple enrolled users may be found to be in the same building or on the same block, in which case aggregated delivery is easily accomplished. In other cases, relative distance between enrolled cardholders may be a reason not to make geo-targeted incentive offers that may not be delivered in a desirable manner with the proposed aggregated delivery and delivery cost sharing that the system aims to accomplish.

As shown at step 818, the system verifies whether the identified cardholders from step 816 have previously conducted a payment card transaction with the enrolled cardholder of the analyzed transaction of steps 808 and 810. If no, the system then returns to continue processing payment card transactions at step 806.

If the system has verified that identified cardholders have previously conducted a payment card transaction with the enrolled cardholder of the analyzed transaction, at step 820 the system verifies whether the identified cardholders from step 816 have previously conducted a payment card transaction with another enrolled merchant (besides the enrolled merchant of the analyzed transaction of steps 808 and 810) in the geofenced area of the analyzed transaction. If no, the system then returns to continue processing payment card transactions at step 806.

If the system has verified that the identified cardholders from step 816 have previously conducted a payment card transaction with another enrolled merchant in the geofenced area, at step 822 the system sends the geo-targeted offers to the identified customers that passed the verification steps of steps 818 and 820.

After the geo-targeted offers are sent at step 822, at step 824, the transaction data is analyzed to see if any of the geo-targeted offers sent have been redeemed. This can be determined by analyzing the transaction data to check for a matching enrolled cardholder, enrolled merchant and item/amount corresponding to an offer previously made. As described above, the geo-targeted offers may be time-limited and must be accepted within the applicable timeframe included in the offer sent at step 822. If an offer has not been redeemed, the system then returns to continue processing payment card transactions at step 806.

If the system determines that an offer has been redeemed at step 824, aggregated delivery is scheduled at step 826. The pick-up and drop-off locations of the goods to be included in the aggregated delivery (the goods for the analyzed transaction at steps 808 and 810 plus the goods relating to any redeemed offer) are identified and communicated to delivery personnel.

At step 828, delivery of the goods may be confirmed in any manner desired, with delivery information being accepted and stored on the system for record keeping purposes.

At step 830, the delivery costs are apportioned among the merchants that had goods delivered and confirmed in the aggregated delivery. In a simple example, if two merchants have aggregated goods delivered, they may each be apportioned half of the delivery cost. If three merchants have aggregated goods delivered, they may each be apportioned one third of the delivery cost. The apportionment of costs could be determined in various other ways as well, which may be agreed to in the merchant agreements upon which the system operates. For example, the proportional dollar value of the goods delivered for each merchant may be represented in the apportionment of costs, or the relative size and weight of the goods delivered for each merchant may factor into the apportionment of delivery costs. However it is accomplished, once the apportionment is determined the system can automatically submit the apportioned costs to the payment card processing network. Statements and reports may be generated on a periodic basis for review by the enrolled merchants to assess the value added by the system in aggregating delivery services, to assess the effectiveness of incentive offers, or for other reasons.

The steps described above are performed iteratively as payment card transactions are processed. Since the processing of transactions is rapidly performed, geo-targeted incentive offer and notifications are generated in a practically instantaneous manner to enrolled cardholders to take advantage of other merchants' offers in the same service area.

As the frequency and number of offers redeemed increases, delivery costs may be lowered substantially for each merchant, leading merchants to perhaps relax delivery eligibility requirements or pass cost savings along to their cardholder customers to strengthen customer relations. Enrolled merchants may beneficially earn dynamic revenue streams via their merchant agreements with other nearby merchants in their respective geofenced areas as well as gain insights into their customer bases relative to other nearby merchants. The system automatically manages aggregated delivery and apportionment of deliver costs without action by the enrolled merchants. The system may store information and generate reports of incentive offers made, incentive offers redeemed, and delivery fee apportionment for merchants to analyze and optimize their use of the system. Increased convenience is therefore provided from both the cardholder and merchant perspective.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic payment card processing system comprising:
    at least one host computing device comprising at least one processor in communication with a memory device and a payment processing server of a multi-party payment processing network, the payment processing server configured to receive electronic messages formatted in a proprietary communications standard promulgated by the payment processing network for the exchange of financial transaction data between financial institutions that are registered with the payment processing network, the messages including transaction data corresponding to payment card transactions initiated by a plurality of cardholders at a plurality of merchants, wherein the at least one host computing device is configured to:
        enroll cardholders of the plurality of cardholders in a service via communication with a cardholder portal application resident on respective cardholder devices of the plurality of cardholders;
        enroll merchants of the plurality of merchants in the service via communication with a merchant portal application resident on respective merchant devices of the plurality of merchants;
        monitor the transaction data in real time as the payment card transactions are made and processed over the multi-party payment processing network;
        from the monitored transaction data, identify in real time a first payment card transaction between a first enrolled cardholder and a first enrolled merchant that includes a first delivery of a first good to a location that is within a predefined geographic area including the first enrolled merchant;
        in response to identifying the first delivery to the first enrolled cardholder in the predefined geographic area, identify at least one incentive offer for at least one of the first enrolled cardholder and additional enrolled cardholders, the at least one incentive offer involving a second delivery from a second enrolled merchant, the second delivery including a second good within the predefined geographic area;
        retrieve, from the memory device, the at least one incentive offer relating to the second enrolled merchant;
        send the at least one incentive offer to at least one of the first enrolled cardholder and the additional enrolled cardholders within the predefined geographic area via communication with the cardholder portal application resident on the respective cardholder devices of the at least one of the first enrolled cardholder and the additional enrolled cardholders;
        from the monitored transaction data, identify in real time a second payment card transaction between a second cardholder from among the at least one of the first enrolled cardholder and the additional enrolled cardholders and the second enrolled merchant, the second payment card transaction being for at least one of an item and a payment amount corresponding to the sent at least one incentive offer, the second payment card transaction evidencing acceptance of the at least one incentive offer by the second cardholder; and in response to identifying the acceptance of the at least one incentive offer, cause an aggregated delivery of orders from the first and the second enrolled merchants to at least one of the first enrolled cardholder and the additional enrolled cardholders within the predefined geographic area.

2. The system of claim 1, wherein the at least one host computing device is further configured to apportion delivery costs of the first and second good between the first enrolled merchant and the second enrolled merchant.

3. The system of claim 1, wherein the at least one host computing device is further configured to:
retrieve at least one incentive offer relating to a second enrolled merchant according to a predetermined merchant type or merchant segment of the respective first enrolled merchant and the second enrolled merchant.

4. The system of claim 1, wherein the at least one host computing device is further configured to:
verify, based on the accepted transaction data, whether the additional enrolled cardholders have previously made a payment card transaction with the first enrolled merchant; and
send the at least one incentive offer only to the additional enrolled cardholders that have verified previously made transactions with the first enrolled merchant.

5. The system of claim 4, wherein the at least one host computing device is further configured to:
verify, based on the accepted transaction data, whether the additional enrolled cardholders have previously made a payment card transaction with at least one other enrolled merchant in the predefined geographic area besides the first enrolled merchant; and
send the at least one incentive offer only to the additional enrolled cardholders that have verified previously made transactions with the at least one other enrolled merchant.

6. The system of claim 1, wherein the at least one host computing device is further configured to:
accept dynamic transaction-based and location-based incentive offer parameters via communication through the merchant portal application resident on the merchant devices of the enrolled merchants.

7. The system of claim 1, wherein the at least one host computing device is further configured to:
determine a location of the first enrolled cardholder within the predefined geographic area; and
determine the location of additional cardholders relative to the location of the first enrolled cardholder.

8. The system of claim 1, wherein the cardholder portal application is a digital wallet, and wherein the at least one incentive offer comprises a notification message presented to the enrolled cardholder via the digital wallet.

9. A method for electronically notifying an enrolled cardholder of a location-based merchant incentive offer when a payment card transaction is made between an enrolled cardholder and an enrolled merchant that includes a delivery of a first good to a location within a predefined geographic area, the method implemented by at least one host computing device in communication with a memory device and a payment processing server of a multi-party payment processing network, the payment processing server configured to receive electronic messages formatted in a proprietary communications standard promulgated by the payment processing network for the exchange of financial transaction data between financial institutions that are registered with the payment processing network, the messages including transaction data corresponding to payment card transactions initiated by a plurality of cardholders at a plurality of merchants, the method comprising:

enrolling cardholders of the plurality of cardholders in a service via communication with a cardholder portal application resident on respective cardholder devices of the plurality of cardholders;

enrolling merchants of the plurality of merchants in the service via communication with a merchant portal application resident on respective merchant devices of the plurality of merchants;

monitoring the transaction data in real time as the payment card transactions are made and processed over the multi-party payment processing network;

from the monitored transaction data, identifying in real time a first payment card transaction between a first enrolled cardholder and a first enrolled merchant that includes a delivery of a first good to a location that is within a predefined geographic area including the first enrolled merchant;

in response to identifying the first delivery to the first enrolled cardholder in the predefined geographic area, identifying at least one incentive offer for at least one of the first enrolled cardholder and additional enrolled cardholders, the at least one incentive offer involving a second delivery from a second enrolled merchant, the second delivery including a second good within the predefined geographic area;

retrieving, from the memory device, at least one incentive offer relating to the second enrolled merchant;

sending the at least one incentive offer to at least one of the first enrolled cardholder and the additional enrolled cardholders within the predefined geographic area via communication with the cardholder portal application resident on the respective cardholder devices of the at least one of the first enrolled cardholder and the additional enrolled cardholders;

from the monitored transaction data, identifying in real time a second payment card transaction between a second cardholder from among the at least one of the first enrolled cardholder and the additional enrolled cardholders and the second enrolled merchant, the second payment card transaction being for at least one of an item and a payment amount corresponding to the sent at least one incentive offer, the second payment card transaction evidencing acceptance of the at least one incentive offer by the second cardholder;

in response to identifying the acceptance of the at least one incentive offer, causing an aggregated delivery of orders from the first and the second enrolled merchants to at least one of the first enrolled cardholder and the additional enrolled cardholders within the predefined geographic area.

10. The method of claim 9, further comprising:
apportioning delivery costs of the first and second good, with the at least one host computing device, between the first enrolled merchant and the second enrolled merchant.

11. The method of claim 9, further comprising:
retrieving at least one incentive offer relating to a second enrolled merchant according to a predetermined merchant type or merchant segment of the respective first enrolled merchant and the second enrolled merchant.

12. The method of claim 9, further comprising:
verifying, based on the accepted transaction data, whether the enrolled additional cardholders have previously made a payment card transaction with the first enrolled merchant; and
sending the at least one incentive offer only to the additional enrolled cardholders that have verified previously made transactions with the first enrolled merchant.

13. The method of claim 12, further comprising:
verifying, based on the accepted transaction data, whether the additional enrolled cardholders have previously made a payment card transaction with at least one other enrolled merchant in the predefined geographic area besides the first enrolled merchant; and
sending the at least one incentive offer only to the additional enrolled cardholders that have been verified as having previously made transactions with the at least one other enrolled merchant.

14. The method of claim 9, further comprising:
accepting dynamic transaction-based and location-based incentive offer parameters via communication through the merchant portal application resident on the merchant devices of the enrolled merchants.

15. The method of claim 9, further comprising:
determining a location of the first enrolled cardholder within the predefined geographic area; and
determining the location of additional cardholders relative to the location of the first enrolled cardholder.

16. The method of claim 9, wherein the cardholder portal application is a digital wallet, and wherein sending the at least one incentive offer to at least one cardholder device of an enrolled cardholder comprises sending a notification message that is presented to the enrolled cardholder via the digital wallet.

17. A non-transitory computer readable medium that includes computer executable instructions for electronically notifying an enrolled cardholder of a location-based merchant incentive offer when a payment card transaction is made between an enrolled cardholder and an enrolled merchant that includes a delivery of a first good to a location within a predefined geographic area, wherein when executed by at least one host computing device having at least one processor in communication with a memory device and a payment processing server of a multi-party payment processing network, the payment processing server configured to receive electronic messages formatted in a proprietary communications standard promulgated by the payment processing network for the exchange of financial transaction data between financial institutions that are registered with the payment processing network, the messages including transaction data corresponding to payment card transactions initiated by a plurality of cardholders at a plurality of merchants, the computer executable instructions cause the at least one host computing device to:

enroll cardholders of the plurality of cardholders in a service via communication with a cardholder portal application resident on respective cardholder devices of the plurality of cardholders;
enroll merchants of the plurality of cardholders in the service via communication with a merchant portal application resident on respective merchant devices of the plurality of merchants;
monitor the transaction data in real time as the payment card transactions are made and processed over the multi-party payment processing network;
from the monitored transaction data, identify in real time a first payment card transaction between a first enrolled cardholder and a first enrolled merchant that includes a delivery of a first good to a location that is within a predefined geographic area including the first enrolled merchant;
in response to identifying the first delivery to the first enrolled cardholder in the predefined geographic area, identify at least one incentive offer for at least one of the first enrolled cardholder and additional enrolled cardholders, the at least one incentive offer involving a second delivery from a second enrolled merchant, the second delivery including a second good within the predefined geographic area;
retrieve, from the memory device, at least one incentive offer relating to the second enrolled merchant;
send the at least one incentive offer to at least one of the first enrolled cardholder and the additional enrolled cardholders within the predefined geographic area via communication with the cardholder portal application resident on the respective cardholder devices of the at least one of the first enrolled cardholder and the additional enrolled cardholders;
from the monitored transaction data, identify in real time a second payment card transaction between a second cardholder from among the at least one of the first enrolled cardholder and the additional enrolled cardholders and the second enrolled merchant, the second payment card transaction being for at least one of an item and a payment amount corresponding to the sent at least one incentive offer, the second payment card transaction evidencing acceptance of the at least one incentive offer by the second cardholder; and
in response to identifying the acceptance of the at least one incentive offer, cause an aggregated delivery of orders from the first and the second enrolled merchants to at least one of the first enrolled cardholder and the additional enrolled cardholders within the predefined geographic area.

18. The non-transitory computer readable medium of claim 17, the computer executable instructions further causing the at least one host computing device to:
apportion delivery costs of the first and second good between the first enrolled merchant and the second enrolled merchant.

* * * * *